Sept. 7, 1965  F. B. HENDERSON  3,204,466

FORCE BALANCED INSTRUMENT

Filed Oct. 31, 1961  5 Sheets-Sheet 1

INVENTOR.
FRANKLIN B. HENDERSON
BY
*Allan Rothenberg*
ATTORNEY

Sept. 7, 1965 F. B. HENDERSON 3,204,466
FORCE BALANCED INSTRUMENT
Filed Oct. 31, 1961 5 Sheets-Sheet 5
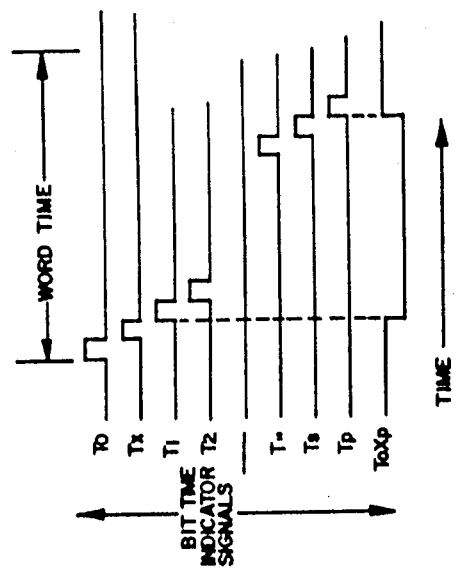
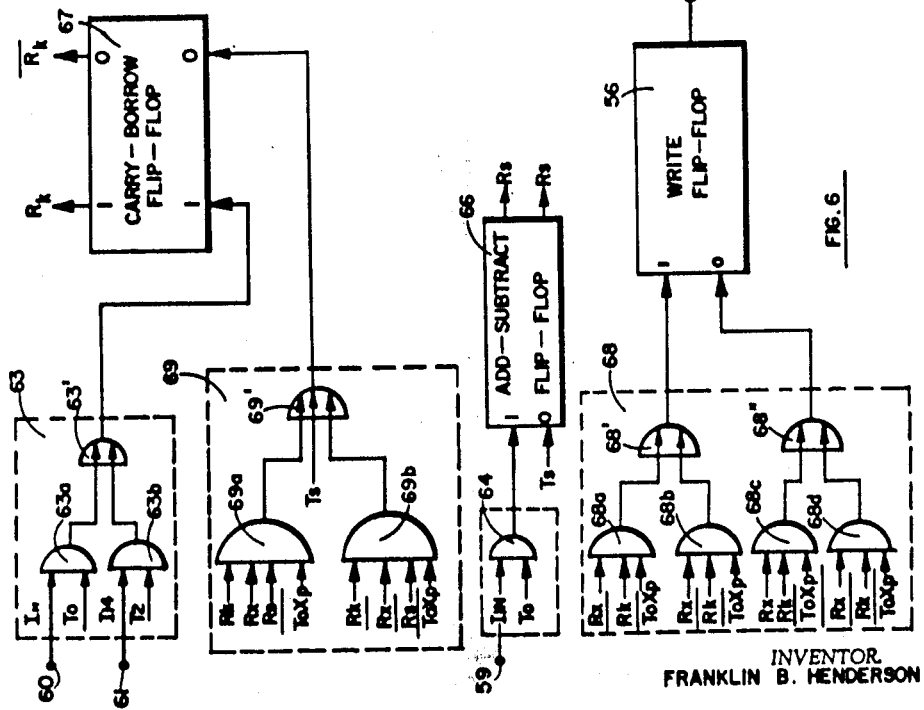
INVENTOR.
FRANKLIN B. HENDERSON
BY
ATTORNEY

United States Patent Office 3,204,466
Patented Sept. 7, 1965

3,204,466
FORCE BALANCED INSTRUMENT
Franklin B. Henderson, Fullerton, Calif., assignor to
North American Aviation, Inc.
Filed Oct. 31, 1961, Ser. No. 149,046
11 Claims. (Cl. 73—503)

This invention relates to a condition sensing device, and more particularly to a force balanced sensor providing integration of output signals in digital form.

The development of automatic missiles has required complex multi-function systems and subsystems for the automatic performance of all on-board control functions associated with operational flight and trajectory control of such missiles. Also, precision performance requirements of such missiles have necessitated the use of control systems employing high-cost, high-precision components. Further, such automatic systems, intended to operate essentially unattended after launch, require an extremely high degree of reliability in order to assure the successful completion of an automatic mission.

The associated complexity of such a multi-function control system mitigates against the desired reliability for such a system. Further, the greater the degree of precision required of a given component in a system, the less reliable such high-precision component will be in maintaining such precision. Accordingly, efforts have been expended in the art to provide better systems integration between the various functional subsystems of a multi-function system to reduce the degree of complexity and number of components required. Such efforts have included, for example, the shared use of general-purpose type digital computers for the performance of trajectory computation, guidance control and flight stabilization functions. Further, such efforts have required the adaptation of flight control systems to almost wholly digital equipment configuration to assure design compatibility with integrated digital guidance equipments.

The elements of a flight control system which are most subject to the configuration effects of the above described design integration efforts are the inertial sensors.

High-performance accelerometers used in current analog inertial control systems are generally of the force-rebalance type, in order to achieve both low-threshold and high range in performance. The force rebalance function is achieved by a closed loop control arrangement including a low-restraint A.-C. pickoff which provides the output of the sensor and means to generate a torquing control signal. The closed loop control is generally accomplished in the art by means of an analog servo amplifier comprising a combination of A.-C. signal amplifier, power amplifier, modulator and demodulator. The torquing control signal is employed in achieving a null output or force rebalance of the inertial sensor. The torquing control signal is further employed as an indication of the sensed inertial parameter. When such an inertial sensor arrangement is used with a digital computer in an integrated control system, a precision analog-to-digital converter is also required to perform the function of converting the analog torquing signal to a form suitable for use by the digital computer. Accordingly, it is a general object of this invention to provide a force balance instrument employing a torquing circuit having a discrete output suitable for integration by a digital accumulator.

In most rate-stabilized attitude control systems for missile applications or the like, rate gyros have been employed in the art for achieving the rate-stabilization function. The disadvantages of such devices are (1) their relatively low reliability and (2) the noise content of the output signals therefrom, and (3) the poor threshold and resolution associated with instruments requiring large performance ranges. Accordingly, it is another general object of this invention to provide improved means for generating digital angular rate signals.

It will be seen that the principles of this invention are applicable to a wide variety of force balanced sensing instruments as applied for use in many different environments such as for example, gyroscopes and linear accelerometers of inertial guidance or flight control systems. Gravity sensing gravimeters may also employ the principles of this invention. Nevertheless, for purposes of exposition, the invention is described as applied to the measurement of angular velocity in a flight control system.

In carrying out the principles of this invention in accordance with a preferred embodiment thereof, there is provided in combination with a force-rebalance type angular accelerometer having a torquer, logic means responsive to the accelerometer for providing logic signals indicative of at least three mutually distinct discrete combinations of sense and magnitude of accelerometer output. There is also provided a digital sampling register or accumulator responsively connected to the logic means for providing a digital output indicative of the time integral of the accelerometer output. A torquing current generator is responsively connected to the logic means for providing a torquing current having a discrete magnitude and sense indicative of the output from the logic means, the torquer of the accelerometer being responsively connected to the current generator.

By means of the above described arrangement, digital torquing is provided for both (1) nulling a force rebalance type accelerometer, and (2) generating discrete signals for computing the time integral of sensed angular acceleration for application in digital rate-stabilized attitude control systems for a missile or like vehicle. The use of discrete signals in such a closed loop flight control application causes the flight control system to display characteristic limit cycle performance. Therefore, the adequacy of the device of the invention in such an application requires that the register sampling rate of the associated digital computations be much higher than the dynamic response of the closed loop control employing the device, in order that the associated limit cycle performance of the device not materially contribute to control system dynamic instabilities and the generation of controlled-vehicle incremental load factors. The device, while providing a signal of limited information content relative to an analog signal, has the compensating advantages of improved reliability and an output of relatively low noise content.

It is an object of this invention, therefore, to provide improved means for reliably generating a torquing signal having low noise content for use in a force rebalance type sensor.

It is another object of this invention to provide means for generating a discrete torquing signal for obtaining the time integral of a sensed acceleration in digital form.

It is a further object of this invention to provide means for digitally torquing a force rebalance type inertial sensor.

It is yet a further object of this invention to provide means for generating a digital signal of low noise content indicative of the time integral of a sensed acceleration.

These and other objects of the invention will become apparent from the following description taken in connection with the accompanying drawings in which:

FIG. 6 is a diagram of the logic of the device of FIG. 5.

FIG. 7 is an exemplary time history of the bit time indicator signals from the bit time indicator of FIG. 5.

In the drawings like reference characters refer to like parts.

Figure 1:
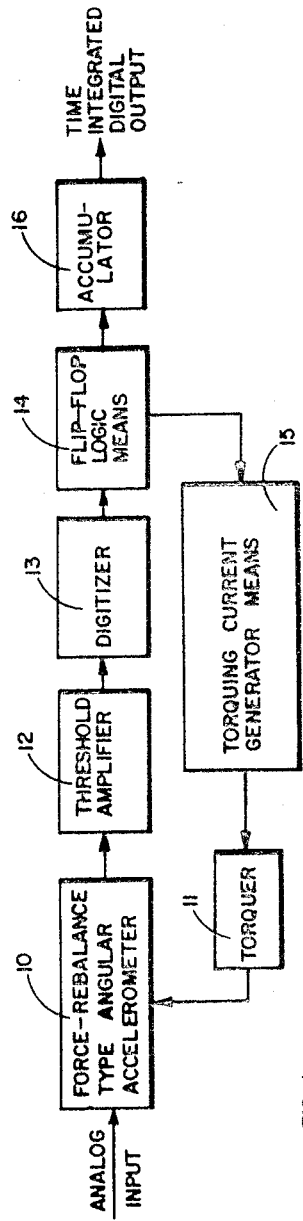
FIG. 1 is a block diagram of a system embodying the principles of this invention.

Referring to FIG. 1, there is provided a force-rebalance type angular accelerometer 10 having a torquer 11. Accelerometer 10 may be any force-rebalance type angular accelerometer having a proof mass mounted for rotation about an axis relative to the accelerometer and a torquer, the output from the accelerometer being operatively connected to the torquer for opposing angular displacement of said proof mass relative to said accelerometer about said axis. A type of such an accelerometer is described, for example, in U.S. patent application Serial No. 858,523, filed December 9, 1959, by Doyle E. Wilcox, et al., for an Accelerometer.

There is also provided digitizer logic and torquing current generator means interposed between the output from accelerometer 10 and the input to torquer 11. The digitizer logic is comprised of a threshold amplifier 12, digitizer 13 and flip-flop logic means 14. Amplifier 12 is responsively connected to the output of accelerometer 10 for providing output signals above certain preselected levels or thresholds. Digitizer 13 is responsively connected to the output of amplifier 12 for providing a set of discrete signals indicative of (1) the comparison of the accelerometer output signals with the thresholds of element 12 and (2) the sense of such accelerometer output signals. Flip-flop logic means 14 is responsively connected to digitizer 13 to provide a set of digitizer logic signals indicative of discrete combinations of magnitude and sense of the accelerometer output. Each of the logic signals from element 14 is of either of two states, such as a relatively low potential representing a "true" condition and a relatively high potential representing "false" condition.

The output of logic means 14 is cooperatively arranged to drive torquing current generator means 15 and a digital sampling register 16. Generator means 15 cooperates with torquer 11 to provide a torquing current to torquer 11 of a sense and discrete magnitude corresponding to the logic signal output from logic means 14 and indicative of the relative angular displacement of the accelerometer proof mass. The torquing current supplied to torquer 11 is one of several mutually exclusive torquing currents each being of a discrete level for providing the force-rebalance control function: a positive current of a given level, a negative current of like magnitude, and zero current within a specified threshold region of accelerometer output.

The accumulator 16 is responsively connected to the output of logic means 14 to provide a discrete output indicative of the time integral of the discrete acceleration signals. Such function is accomplished by sampling the logic signals at a fixed sampling rate, and accumulating in the accumulator 16 the discrete information so sampled. The sampling rate selected and the discrete signal levels employed determine the scale factor of the register output. For example, a sampling rate of 3 kc. (representing a period of .00033 seconds) and a discrete signal level of 150 degrees per second squared would provide a time integral output resolution of .05 degrees per second, in accordance with the relationship:

$$\Delta \dot{\theta} = \int_{t_1}^{t_1+\Delta t} \ddot{\theta} dt = \oplus \Delta t \qquad (1)$$

where:

$\Delta t$ = Time interval between sampling instants $\Delta \dot{\theta}$ = Incremental angular rate occurring in the sampling time interval $\Delta t$ between $t_1$ and $(t_1 + \Delta t)$ $\oplus$ = Discrete or fixed level of indicated angular acceleration The total angular rate signal appearing at the output of register 16 represents the summation of the incremental angular rate measurements according to the general equation:

$$\dot{\theta}(t) = \int_0^t \ddot{\theta} dt = \sum_0^t \oplus(t_i) \Delta t \qquad (2)$$

where:

$\dot{\theta}(t)$ = Angular rate at time $t$.

$\oplus(t_i)$ = Discrete or fixed level of indicated angular acceleration at any sampling time $t_i$ up to and including time $t$.

$\Delta t$ = Time interval between sampling instants.

Because of the discrete levels used in the feed back loop or torquing control of the force-rebalance type accelerometer and in the sample data register, less noise is present in the rate signal output from register 16 than is present in the output from rate gyros which are usually employed in the art to obtain angular rate measurements. Further, the simple two-state signal means employed for obtaining the discrete signal forms is inherently simpler and more reliable than the equivalent analog means, and better lends itself to direct employment by a digital guidance system. No compromise between range of performance and rate-resolution is required. Improved rate resolution is achieved by increasing the sample rate of the register (e.g., decreasing the time interval $\Delta t$ in Equation 1).

The size of the discrete signal levels employed in the comparator logic (elements 12, 13 and 14) determines the adequacy of torquer response to the rate-generating acceleration inputs to accelerometer 10, and is selected from a consideration of the acceleration environment in which the sensor is intended to be employed. The threshold region (e.g., acceleration for which no torquing current signals are generated by generator means 15) is defined in a system employing three signal levels (e.g., plus, zero, minus) as the interval or acceleration range between the two discrete levels "plus" and "minus."

Where finer signal resolution is required in the output of register 16 or where limit cycle performance considerations require, an interim discrete level of torquing signal may be additionally employed, with a consequent increase in the complexity of the comparison logic and the torquing current generator. The mutually exclusive torquing signals provided would be of five signal levels, "plus-high," "plus-low," zero, "minus-low," "minus-high," representing combinations of three magnitudes (high, low, zero) and two senses (plus and minus). The additional signals represented by such five level logic would also add to the complexity of the accumulator. The improved resolution is indicated by the reduction in $\Delta \dot{\theta}$ resulting from a smaller $\oplus$ in Equation 1. A more detailed mechanization of a five-level signal device is shown in FIG. 2.

Figure 2:
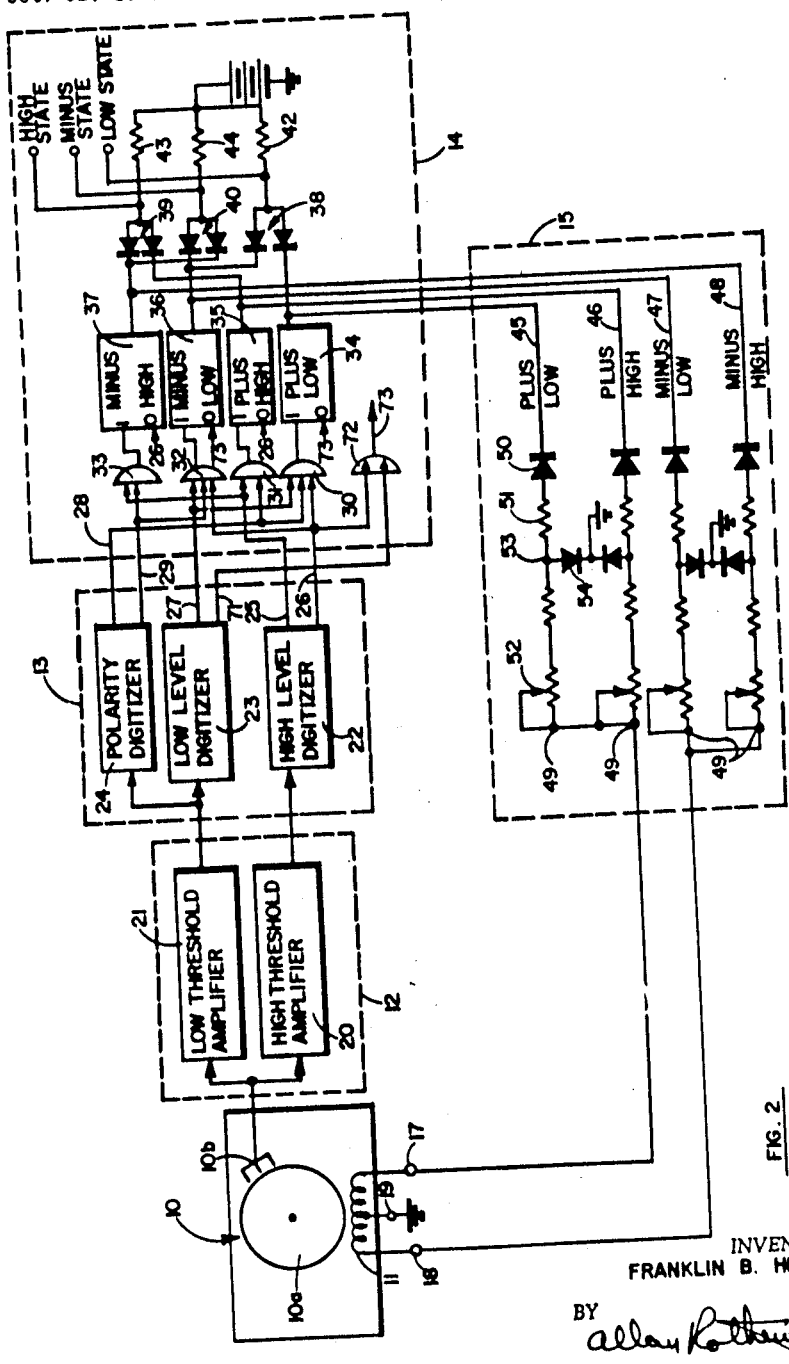
FIG. 2 is a functional schematic illustrating a preferred embodiment of the device of FIG. 1.

Referring to FIG. 2, there is a functional schematic of a preferred embodiment of the device of FIG. 1. A force-rebalance type accelerometer 10 is shown, with a torquing coil 11, a proof mass 10a movable relative to the accelerometer assembly, and an analog pickoff 10b for providing an output signal substantially proportional to the relative displacement of the proof mass. Position pickoff 10a may be comprised of a suitable electromagnetic or capacitive type as described, for example, in the above mentioned application, Serial No. 858,523. Torquing coil 11 is shown as a centertapped element for conducting unidirectional current from either of terminals 17 and 18 to centertap terminal 19, whereby a magnetizing current of either of two senses may be employed for torquing the proof mass 10a of angular accelerometer 10 toward a null position.

There is also provided digitizer logic means and torquing current generator means interposed between the output from accelerometer 10 and the input to torquer 11. The digitizer logic means is comprised of threshold amplifier 12, digitizer means 13 and logic means 14 all arranged to cooperate in the same manner as like-referenced elements of FIG. 1. Threshold amplifier 12 is comprised of a first amplifier 20 having a first preselected threshold level and a second amplifier 21 having a second preselected threshold level less than the threshold of first amplifier 20, both of first and second amplifiers 20 and 21 being responsively connected to the output from accelerometer 10.

The means for incorporating a bidirectional threshold characteristic into an amplifier is well-known in the art and is described, for example, in FIG. 6.23c at page 292 of "Electronic Analog Computers" (second edition), McGraw-Hill (1956). Where the output from accelerometer 11 is in the form of an A.-C. signal, amplifiers 20 and 21 will incorporate structure to provide rectification by means of phase sensitive detectors or like means well-known in the art for providing a D.-C. signal of a sense and magnitude indicative of the accelerometer output. Hence, the output signal is a bi-polar D.-C. output, regardless of the form of the accelerometer pickoff signal.

Digitizer means 13 comprises a first high level digitizer 22, second low level digitizer 23 and third polarity digitizer 24. It may be noted that the two-state signals employed in the described embodiment comprise a relatively negative or low potential such as −6 v., for example, representative of "true" or "on" and a relatively high potential such as ground representing "false" or "off." First digitizer 22 is responsively connected to the output of first amplifier 20 for providing on line 25 a first two-state output signal indicative of the presence of an output signal from first amplifier 20, and further providing on line 26 a second two-state output signal (NOT signal) indicative of the absence of an output signal from first amplifier 20 as is more particularly shown in FIG. 3. The additional NOT signal is required for the logic means for reasons which are hereinafter explained.

Second digitizer 23 is responsively connected to the output of second amplifier 21 for providing on line 27 a third two-state signal indicative of the presence of an output signal from second amplifier 21 and further providing on line 71 an auxiliary two-state output signal (NOT signal) indicative of the absence of an output signal from second amplifier 21. The auxiliary NOT signal is required for reasons which will be hereinafter explained. It is to be noted that any input signal exceeding the larger threshold of amplifer 20 will also exceed the smaller threshold of amplifier 21. Therefore, low level digitizer 23 will always provide an output signal when digitizer 22 does, as well as providing an output signal for inputs above the smaller threshold but below the larger threshold in magnitude. Each of digitizers 22 and 23 may be comprised of switching circuit elements or other devices well known in the art for obtaining two-state signals as is more particularly shown in FIG. 3.

Third polarity digitizer 24 is responsively connected to the bi-polar D.-C. output of amplifier 21 for providing on line 28 a fourth two-state signal indicative of the presence of an output signal from amplifier 21 of one sense, and further providing on line 29 a fifth two-state output signal indicative of the presence of an output signal from amplifier 21 of the opposite sense. Line 28 is "on" and line 29 is "off" for positive input signals, line 28 being "off" and line 29 being "on" for negative input signals. Both lines are "off" when no signal is present (e.g., accelerometer output is below the lower threshold level of element 21). Digitizer 24 may be comprised of a polarized two-pole switching element, or other means well-known in the art for obtaining two-state signals for indicating the sense of a phase-sensitive D.-C. signal, as is more particularly shown in FIG. 3.

Figure 3:
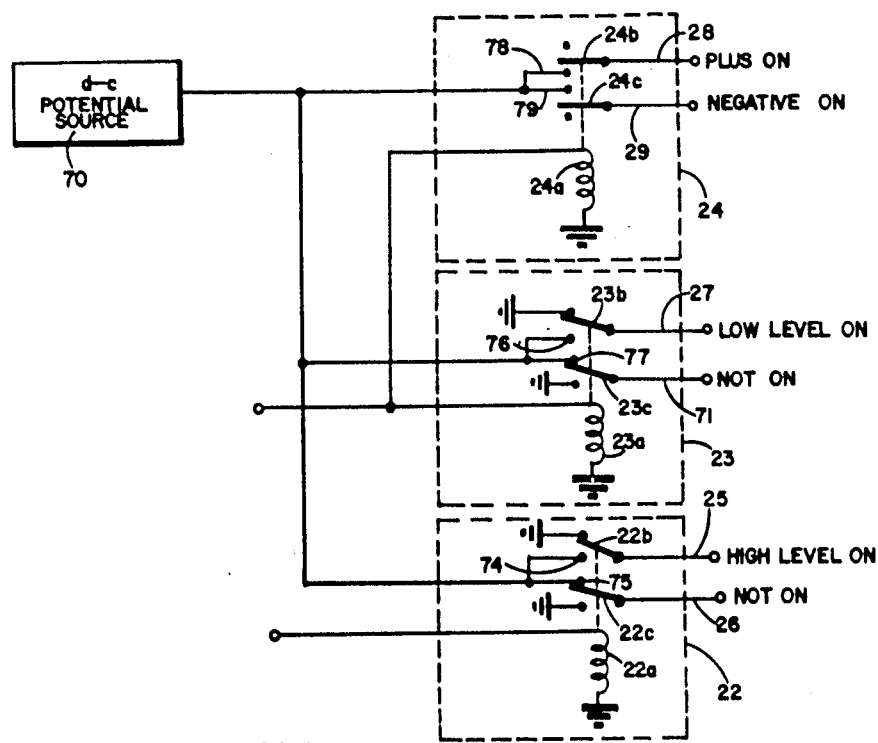
FIG. 3 is a functional schematic of the digitizer of FIG. 2.

Referring to FIG. 3, there is illustrated an exemplary embodiment of digitizer assembly 13 of FIG. 2, including high level digitizer 22, low level digitizer 23 and polarity digitizer 24. High-level digitizer 22 is comprised of a double pole non-polarized relay, having a relay coil 22a responsively connected to the D.-C. output of element 20 of FIG. 2, first and second armatures 22b and 22c (shown in de-energized position in FIG. 3), and first and second relay contact points 74 and 75 commonly connected to a source of potential 70. When no signal input is applied to relay coil 22a, then the normally-closed condition of first armature 22c and contact point 75 provides a fixed-amplitude output signal on line 26 indicative of the fact that there is not an input, such output signal being referred to as a NOT signal. When an input signal is applied to relay coil 22a thereby energizing relay 22, then first armature 22b and contact 74 open, removing the fixed amplitude signal from line 26 and second armature 22c and contact 75 close, thereby producing a fixed-amplitude output signal on line 25.

Low level digitizer 23 in FIG. 3 is comprised of a double-pole non-polarized relay, having a relay coil 23a responsively connected to the output of element 21 of FIG. 2, first and second armatures 23b and 23c (shown in de-energized position in FIG. 2), and contact points 76 and 77 commonly connected to source 70. It is to be noted that relay 23 is arranged substantially the same as relay 22, and further, operates in a similar manner to provide two mutually exclusive two-state signals.

Polarity digitizer 24 in FIG. 3 is comprised of a polarized double-pole relay having a relay coil 24a responsively connected to the bi-polar D.-C. output of element 21 of FIG. 2 in order to provide a control signal to relay coil 24a which is indicative of the phase or sense of the output from element 21. There are provided a first and second armature 24b and 24c (both shown in a de-energized or "normally open" position in FIG. 2), and contact points 78 and 79 commonly connected to source 70. When an input signal energizes relay coil 24a of the polarized relay, polarized armatures 24b and 24c are caused to move in a common direction indicative of the sense of the input signal to relay coil 24a. If a signal of positive sense is applied, the armatures will move downward in FIG. 3, causing line 28 to be connected through armature 24b and contact 78 to source 70, thereby producing a fixed-amplitude signal on line 28. If a signal of opposite sense is applied to relay coil 24a, the armatures will move upward in FIG. 3, removing the output signal from line 28 and causing line 29 to be connected through armature 24c and contact 79 to source 70, thereby producing a fixed-amplitude signal on line 29.

Logic means 14 in FIG. 2 is comprised of a first, second, third and fourth AND gates 30, 31, 32 and 33 respectively, for driving first, second, third and fourth bistable circuit elements or flip-flops 34, 35, 36 and 37, respectively, whereby the following four logic signals are explicitly derived: "plus-high," "plus-low," "minus-high" and "minus-low." "Zero" is generated implicitly by the concurrent absence of all true signals from lines 25, 26, 27, 28, and 29 so that no AND gate provides a (true) output. The "plus-high" and "minus-high" AND gates 31 and 33 employ the high level digitizer output from line 25 and, respectively, the "plus" and "minus" polarity digitizer lines 28 and 29. For example, when the signal on line 25 is true and the signal on line 28 is true, the output of gate 31 is true to set the flip-flop 35 to its true state wherein its indicated output is relatively low. There is also provided an OR gate 72 responsively connected to lines 26 and 71 for providing a reset signal on output line 73 for reasons which will be explained hereinafter.

The "plus-low" and "minus-low" AND gates 30 and 32 similarly employ the low level digitizer output from line 27 and, respectively, the "plus" and "minus" polarity digitizer lines 28 and 29, but with one difference, however. In order to eliminate the ambiguity in the output of low level digitizer 23 (e.g., true signal on line 27 in the presence of either a high level or low level output from accelerometer 10), the false signal on line 26 from high level digitizer 22 is also applied to each of "plus-low" and "minus-low" AND gates 30 and 32 whereby the output of these gates will be true only when the output of digitizer 22 is false.

In other words, first AND gate 30 is responsively connected to second, third and fourth two-state signals on lines 26, 27 and 28, respectively, for providing a first discrete logic signal indicative of a combination of low magnitude and positive sense. Second AND gate 31 is responsively connected to first and fourth two-state signals on line 25 and 28 for providing a second discrete logic signal indicative of a combination of high magnitude and positive sense. Third AND gate 32 is responsively connected to second, third, and fifth two-state signals on lines 26, 27 and 29 for providing a third discrete logic signal indicative of a combination of low magnitude and negative sense. Fourth AND gate 33 is responsively connected to first and fifth two-state signals 25 and 29 for providing a fourth logic signal indicative of high magnitude and negative sense. Each of AND gates 30, 31, 32 and 33 and OR gate 72 may be of a type well-known in the art, and these elements are therefore shown in block diagram form only for convenience in illustration.

Referring to the four bi-stable circuit elements or flip-flops 34, 35, 36 and 37 in FIG. 2, each may be of a type well-known in the art, having two inputs (1-set and 0-set) and two outputs (1 and 0). When the "1-set" input is on or "true," the flip-flop is driven or set to its "true" condition, wherein its "1" output is "true" (e.g., "on") and its "0" output is "false" (e.g., "off"). When the flip-flop "0" input is "true," the flip-flop is re-set to its initial "false" condition, wherein the "1" output is false (off) and the "0" output is "true" (on). The only output employed by the logic of element 14, however, is the "1" output from the four flip-flops 34, 35, 36 and 37.

The 1-set input to each of elements 34, 35, 36 and 37 corresponds to one of the four explicit AND gate combinations of signal level and polarity to provide a two-state output signal which is employed in two functions. The first function is to provide an input to sample register 16, and the second function is to drive torquing current generator 15. The two "high-level" flip-flops 35 and 37 are "0" set or reset by "NOT" signals on line 26 applied to the "0-set" inputs thereto. Similarly, the two "low-level" flip-flops 34 and 36 are reset by the NOT signal on line 73 from OR gate 72 applied to the "0-set" inputs thereto upon change in the accelerometer output signal range to either a range less than or greater than the low-level range (e.g., less than the threshold of amplifier 21 or greater than the threshold of amplifier 20 in FIG. 2).

In the first function, the four two-state signals from elements 34, 35, 36 and 37 are combined in three combinations by means of three OR gates to provide three two-state input lines to sampling register 16, whereby the angular accelerometer data may be employed in a digital computer to generate angular rate information. The three two-state signals provided are "High" or "Low" (in the alternative) and a polarity signal (each state of the latter being indicative of one of two senses). Zero magnitude is implicit in the absence of both "High" and "Low" signals.

In accomplishing the above described function, a first OR gate 38 is responsively connected to first and third flip-flops 34 and 36 for providing a two-state logic signal indicative of signals of a first discrete level, representing the low threshold of amplifier 21. A second OR gate 39 is responsively connected to second and fourth flip-flops 35 and 37 for providing a two-state logic signal indicative of signals of a second discrete level, representing the high threshold of amplifier 20. A third OR gate 40 is responsively connected to third and fourth flip-flops 36 and 37 for providing a two-state logic signal indicative of the sense of the signals from element 10. The outputs from each of OR gates 38, 39, and 40 constitute the input to sample register 16.

In the second function of logic means 14, the four two-state logic signals from elements 34, 35, 36 and 37 are fed to torquing current generator 15. Generator 15 has a two-wire output to torquing coil 11, thereby representing the two possible senses or polarities of a desired torquing current in a push-pull or three-wire system, (the third wire being represented by a common ground return). A source of D.C. potential 41 is connected between logic means 14 and the grounded centertap terminal 19 of torquing coil 11. The connection between the logic means and the D.-C. potential is accomplished by means of resistors 42, 43, and 44 interposed between source 41 and OR gates 38, 39 and 40, respectively.

Torquing current generator 15 is comprised of a first, second, third and fourth constant current paths 45, 46, 47 and 48 responsively connected to first, second, third and fourth flip-flops 34, 35, 36 and 37 respectively. Second and fourth paths 46 and 48 provide current flow of a first discrete level corresponding to the threshold of amplifier 20, while first and third paths 45 and 47 provide current flow of a second discrete level which is less than the first level and corresponding to the threshold of amplifier 21. First and second paths 45 and 46 are commonly connected to first end-terminal 17 of torquing coil 11 for providing a first pair of torquing control signals of at least two discrete levels and of like sense, while third and fourth paths 47 and 48 are commonly connected to second end-terminal 18 of torquing coil 11 for providing a second pair of torquing control signals of discrete levels similar to and of a sense opposed to that of the first pair of control signals.

Each of the constant current paths 45, 46, 47 and 48 of torquing current generator means 15 is comprised of an output terminal 49 in series circuit with a diode 50, a series impedance 51, and a two-terminal current control impedance 52 having a first terminal 53 connected to one terminal of series resistor 51 and a second terminal connected to output terminal 49. Zener diode 54 is connected across first terminal 53 and centertap terminal 19 of coil 11.

The zener diode serves as a constant voltage device in parallel with the torquing current path. A given torquing current circuit includes the control impedance 52 and one-half the impedance of center-tapped torquing coil 11. Since a zener diode is in parallel with each of the torquing coil circuits, the zener reference voltage is commonly across each of the torquing circuits. Now, because the torquing coil impedance is extremely low, relative to the impedance of the current control impedance 52, the torquing circuit impedance is determined mainly by the circuit resistors in series with the torquing coil. Hence, the torquing current in each of the four circuits of current generator 15 is essentially inversely proportional to the circuit resistors in each circuit. Accordingly, the values of the impedances for each of circuit paths 45, 46, 47 and 48 are selected to correspond with the associated torquing level desired for such circuit path.

While a five-level ("plus-high," "plus-low," zero, "minus-low," "minus-high") device has been described and illustrated, the concept of the invention is not limited to a five-level output. The device could be made to provide a seven or more level output or a three-level ("plus," zero and "minus") output, depending upon allowable limit cycle performance for a specific application. A three-level system, would, of course allow simplification of the logic and mechanization of the required torquing current generator, as illustrated in FIG. 4.

Figure 4:
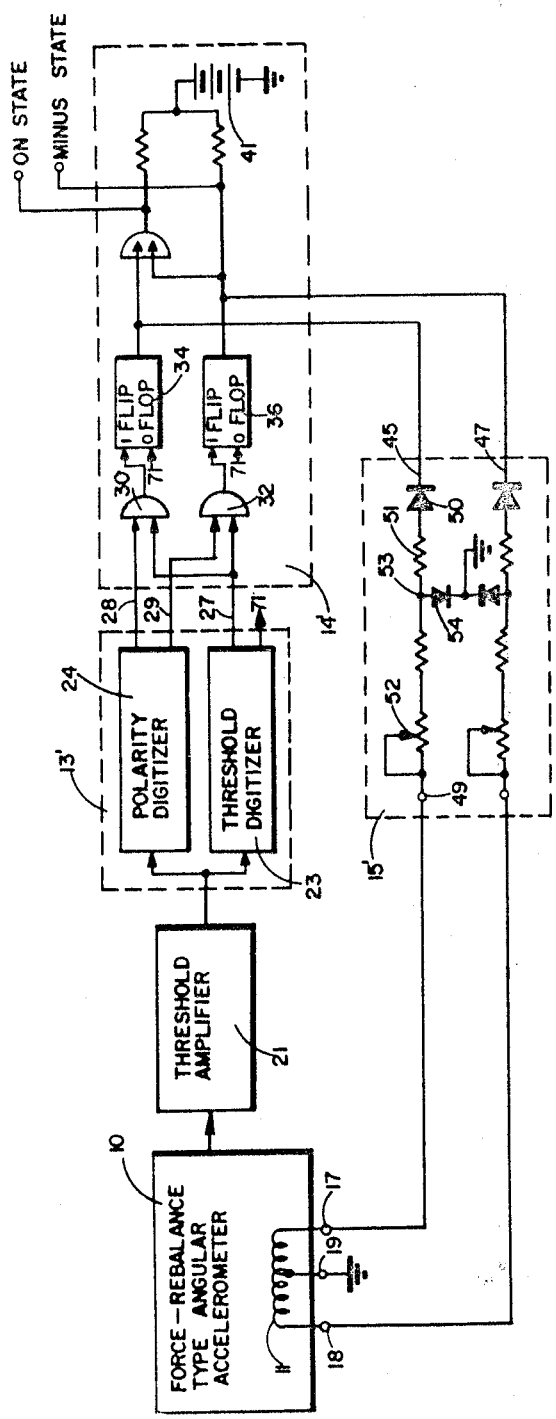
FIG. 4 is a functional schematic illustrating an alternate embodiment of the device of FIG. 1.

Referring to FIG. 4, there is illustrated an alternate embodiment of the device of FIG. 1. The digitizer logic is comprised of a single threshold amplifier 21, digitizer 13' and flip-flop logic means 14' all arranged to cooperate in a similar manner as like referenced elements of FIG. 2.

Digitizer means 13' comprises a first threshold level digitizer 23 and second polarity comparator 24. First digitizer 23 is responsively connected to the output of threshold amplifier 21 for providing on line 27 a first two-state signal indicative of the presence of an output signal from amplifier 21, and further providing on line 71 a second two-state signal indicative of the absence of an output signal from amplifier 21. Second digitizer 24 is responsively connected to the output of amplifier 21 for providing on line 28 a second two-state signal indicative of the presence of an output signal of one sense from amplifier 21, and further providing on line 29 a third two-state output signal indicative of the presence of an output signal of the opposite sense from amplifier 21. Line 28 is true and line 29 is false for positive input signals, line 28 being false and line 29 being true for negative output signals. Both lines are false when no output signal from element 21 occurs.

Logic means 14' is comprised of a first and second AND gate 30 and 32 respectively arranged for driving or 1-setting first and second flip-flops 34 and 36 respectively, whereby a "plus-on" and "minus-on" logic signals are explicitly derived alternatively. "Zero" is generated implicitly by the concurrent absence of the two "on" signals. The 1-set input of first AND gate 30 is responsively connected to lines 27 and 28 for providing a first discrete logic signal indicative of a combination of discrete signal level and positive sense. The 1-set input of second AND gate 32 is responsively connected to lines 27 and 29 for providing a second discrete logic signal indicative of a combination of discrete signal level and minus sense. The 0-set input of each of elements 34 and 36 is connected to output line 71 of element 23.

Each of elements 34 and 36, corresponding to one of the explicit AND gate signal combinations, is employed to drive both sample register 16 and torquing current generator 15'.

Generator 15' is comprised of a first and second constant current path 45 and 47. First path 45 is connected in circuit between first flip-flop 34 and first end-terminal 17 of centertapped coil 11. Second path 47 is similarly connected in circuit between second flip-flop 36 and second end-terminal 18 of coil 11. Each of constant current paths 45 and 47 is comprised of like elements similarly arranged as the correspondingly numbered current paths of FIG. 2.

The purpose of the accumulator 16 in FIG. 1 is to (1) accumulate at a fixed sampling rate $$\frac{1}{\Delta t}$$

the logic signal outputs from the flip-flop logic means 14 of FIG. 2, thereby representing an incremental angular rate $$(\Delta \dot{\theta}_i = \ddot{\oplus} \Delta t)$$

represented by such logic signal outputs, (2) store the binary coded result of a previous sample until a successive sampling interval, (3) remove the stored result from the memory upon a successive sampling time $t_{i+1}$ and add to it the incremental angular rate indicated by such subsequent sampling interval $$(\Delta \dot{\theta}_{i+1} = \ddot{\oplus}_{i+1} \Delta t)$$

and then (4) store the result $$(\dot{\theta}(t_i+1) = \sum \ddot{\oplus} \Delta t)$$

This sequence is repeated at the sampling rate of the accumulator to provide at the output thereof a binary coded number each word time which is indicative of angular rate as the time integral of the angular acceleration measured by accelerometer 10 of FIG. 2. For this purpose there is employed a particular arrangement of logic circuitry together with a recirculating memory type register. Such a device may be mechanized by application of basic components well-known in the digital computer art and employed in an arrangement illustrated in FIGS. 5 and 6.

Figure 5:
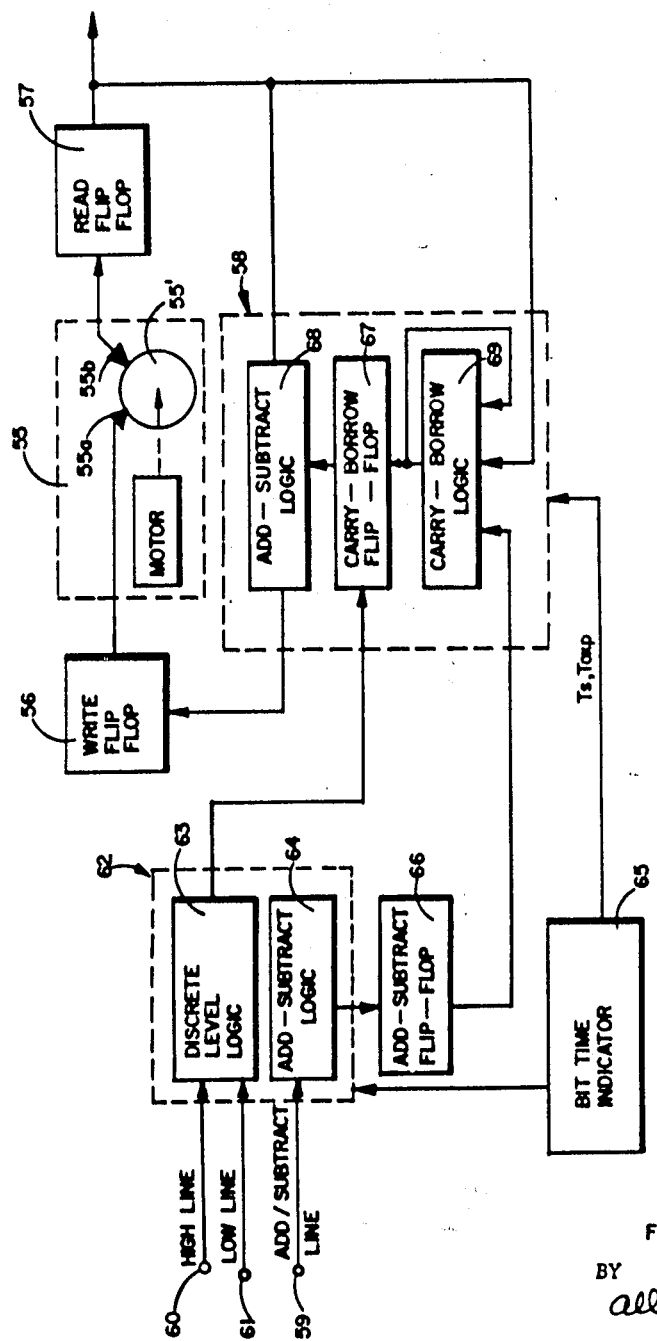
FIG. 5 is a functional block diagram of the digital register of FIG. 1.

Referring to FIG. 5, there is illustrated a functional block diagram of digital sample register 16 of FIG. 1. There is provided a recirculation loop magnetic memory 55 including a magnetic disk 55' driven at constant speed, a write-head 55a for inserting information therein and a read-head 55b for retrieving information therefrom. Arranged in cooperating operative relationship with the register memory 55 are a write flip-flop 56 which feeds write-head 55a and a read flip-flop 57 responsive to read-head 55b, for controlling the memory operations of data insertion (writing) and data retrieval (reading) respectively.

Also provided is a conventional bit time indicator 65 for providing timed pulses or bit times at a rate corresponding to the speed of rotation of the memory. These bit times correspond to the specific operations and arithmetic functions performed by the device of FIG. 5 within a given word time or sampling interval. In this way, means is provided for effecting bit time coding or serial control within a given word time or sampling interval. The bit time indicator and recirculating memory are fundamental and well-known components of a serial binary computer and specific details of such components are not part of this invention.

In normal operation of element 55, the read and write flip-flops 57 and 56 and other elements of the logic are clocked (by connections not shown) or enabled by clock pulses from a clock pulse generator (not shown), as is well-known to those skilled in the art. Thus, at each bit time of a given word time write flip-flop 56 and read flip-flop 57 are enabled whereby every binary digit representing part of a number or word to be handled is indicated by the several flip-flops at the corresponding bit time within a given word time or sampling interval, as in the usual operation of the conventional circulating memory. Hence, a binary coded number is recorded as a time series of two-state signals occurring within a given word time. A word time is conventionally employed to designate the time required for a full cycle of circulation of information stored in the memory. In the described embodiment, word time and sampling intervals are of the same length. The digits of the stored numbers appear as serially spaced magnetic impressions upon magnetic disk 55'.

In reading out or retrieving the data recorded upon disk 55' by means of read-head 55b and clocked read flip-flop 57, the retrieved data is represented as the state (true or false) in the output of flip-flop 57 occurring in a serial fashion in time, corresponding to the bit times of the binary coded word or number recorded in the preceding word time. The data of a given word time is recorded by element 56 and is subsequently read by element 57 when the rotation of the disk brings such data to the read-head.

A one-input adder-subtractor 58 is provided for adding the output of read flip-flop 57 and the input on the three input lines 59, 60, and 61 representing the polarity and high and low discrete level signals from accelerometer logic means 14 of FIG. 2. Adder-subtractor 58 is comprised of carry-borrow logic 69, a carry-borrow flip-flop 67 and add-subtract logic 68.

Interposed between adder 58 and the input signal lines 59, 60 and 61 is a weighting logic means 62 for converting the input logic signals to binary coded signals of proper time phase or weight, wherein each digit of a binary coded number is represented by the state of a flip-flop at an exclusive time interval or bit time within the sampling time of the accumulator. Such conversion of the accelerometer discrete level logic signals relies upon the discrete levels of the accelerometer torquing signals being selected as representing the ratio of two binary digits employed in the selected binary number code (e.g., 1, 2, 4, 8, etc.). For use with the illustrated accumulator, it is desired that the ratio of magnitudes of discrete torquing levels be the same as the ratio of weights of a pair of orders in the particular digital code employed. Thus for the straight binary code the ratio of levels should be the ratio of any two of the weight values 1, 4, 8, 16, etc. This choice affords considerable simplification of the integrating logic. In the illustrated embodiment, the low level represents a level of relative weight 1 and the high level represents relative weight "4." In other words, the magnitudes of the two discrete levels represent a ratio of one to four for the example described herein.

At any given instant the memory contains a number representative of the integrated output of the sensing instrument. To keep the number in memory currently equal to the integrated output, incremental outputs of the instrument must be added to the number in memory. These incremental outputs are indicated by the discrete torquing levels so that a high level torquing signal (represented by a true signal on line 60) indicates a change of instrument output of one magnitude whereas a low level torquing signal (represented by a true signal on line 61) indicates a change of sensing instrument output of a second and lesser magnitude. The sense of such outputs, of course, is indicated by the signal on line 59 which accordingly controls the sense of the combination of the increment with the stored number. For the digital integration there is added to the number stored in memory a number of relatively great magnitude if the high line 60 is true or a number of relatively small magnitude if the low line 61 is true. Each of these levels, whether high or low, is added to the number simply by adding a single unit to the number stored in memory. The difference in magnitude is taken care of by control of the time or phase at which the single unit is added to the number in memory. Thus, if the line 61, the low line, is true, a single unit is added to the lowest order (of relative weight 1) of the number stored in memory whereas if the high line is true, a single unit is added to the third least significant order (of relative weight four) of the number stored in memory. Thus the stored number is either augmented or diminished once during each word time, whereby it contains the results of the incremental integration of the sensed condition.

Logic means 62 is comprised of discrete level logic 63 and add-subtract logic 64. In converting the accelerometer discrete level logic signals to the bit-time numbers employed in a serial digital computer, each of the discrete level signals, representing a bit or digit of a binary coded number (e.g., "1" or "4"), is fed together with a corresponding bit-time indicator signal (from bit-time indicator 65) to an AND gate of the discrete level logic 62. The add-subtract input signal on line 59 (representing the polarity torquing logic output signal from logic means 14 of FIG. 2) is processed through add-subtract AND gate 64 with a corresponding bit-time indicator to provide the bit-time logic for driving add-subtract flip-flop 66.

There is provided a carry-borrow flip-flop 67 which determines whether a single bit is to be added (or subtracted) by logic 68 to the number stored in memory 55, the bit-time at which element 67 is turned on determining the magnitude of the single digit which is combined by logic 68 with the number from flip-flop 57. The carry-borrow flip-flop 67, in turn, is driven or set by logic means 63 and also by carry-borrow logic 69 which employs as inputs the outputs from each of read flip-flop 57, add-subtract flip-flop 66, and carry-borrow flip-flop 67.

The purpose of the input to element 69 from add-subtract flip-flop 66 is to control whether the input from carry-borrow logic is added or subtracted at logic 68. The reason for the input to carry-borrow logic 69 from carry-borrow flip-flop 67 and read flip-flop 57 arises from the inherent operational characteristics of a serial one input adder, which will be more fully appreciated from the ensuing description.

The means by which the device of FIG. 5 effects the convertion of discrete level logic signals to bit-time binary coded signals, and then performs as a one input adder is illustrated in further detail in FIG. 6.

Referring to FIG. 6, there is illustrated a diagram of the logic of the device of FIG. 5. The bit-time indicator signals generated by element 65 of FIG. 5 are shown in FIG. 7 in exemplary time history relationship for a given word time, $T_o$ representing a start time, $T_p$ an end time, and $$T_{o_{x_p}}$$

representing the time interval therebetween in a given word time. In the exemplary embodiment of FIG. 6 there is employed a number of twelve binary digits which appear in a given position at bit times $T_1$ through $T_{11}$ and $T_s$. Bit-times $T_o$, $T_x$ and $T_p$ make up the remainder of a word time having a total of fifteen bits. The symbols $I_{11}$, $I_{14}$ and $I_{IN}$ represent the high, low and add-subtract signals respectively obtained from OR gates 38, 39, 40 of FIG. 2. The other symbols employed as inputs are identified as the indicated outputs of the elements illustrated.

The logic flip-flops of FIG. 6 are of the type previously described having two inputs (1-set and 0-set) and two outputs (1 and 0) when the "1-set" input is true the flip-flop is set to its true condition wherein its "1" output is true and its 0 output is false. When the 0-set input is true the flip-flop is reset to its false condition wherein its 1 output is false and its 0 output is true.

The 1-set side of flip-flop 67 derives its true or "on" signal from the output of an "or" gate 63′ having inputs thereto from AND gates 63a and 63b. The 0-set side of flip-flop 67 derives its true or "on" signal from "or" gate 69′ having three inputs thereto from AND gates 69a and 69b and a bit-time indicator signal $T_s$ as shown in FIG. 6. Each of these AND gates has inputs thereto as indicated in FIG. 6.

The 1-set side of flip-flop 66 derives its true signal from AND gate 64 having two inputs thereto as indicated in FIG. 6. The 0-set side of flip-flop 66 derives its true signal from bit-time indicator signal $T_s$.

The 1-set side of flip-flop 56 derives its true signal from OR gate 68′ having two inputs thereto from AND gates 68a and 68b. Each of these AND gates has inputs thereto as indicated in FIG. 6. The 0-set side of flip-flop 56 derives its true signal from OR gate 68″ having two inputs thereto from AND gates 68c and 68d. Each of these AND gates has inputs thereto as indicated in FIG. 6.

The number in the accumulator represents the integral of the condition sensed by the instrument and may be conveniently employed in the digital calculations involving the integrated value. In fact the register may itself form part of a serial digital computer of a flight control or navigation system which performs calculations involving the integral of sensed acceleration. An output indication of the number in the memory is derived from read flip-flop 57.

The logic circuitry within the dotted box 68 of FIG. 6 accordingly operates to achieve addition or subtraction of the digit (carry, if any) in the carry-borrow flip-flop 67 to the number stored in the memory. Specifically the addition is carried out by adding or subtracting the digit represented by the carry-borrow flip-flop 67 (having outputs $R_k$ and $\overline{R}_k$) to or from the digit represented by $R_x$ and $\overline{R}_x$ (the outputs of read flip-flop 57), as the number in memory continues to pass through the read flip-flop 57. If the addition of the digit represented by $R_k$ to $R_x$ is initiated at the beginning of the word time, at $T_0$, the number in memory is changed by a single unit in its lowest order. On the other hand if the addition or subtraction of the digit $R_k$ is initiated at bit-time $T_2$, two bit-times later, the number in memory is changed by a single digit in its third least significant order. This achieves a change which is four times greater since relative values or relative weights of first and third orders are one and four respectively.

It is noted that the carry-borrow flip-flop 67 is set to zero at each $T_s$ time, that is, at the end of each word time where it is then in position to be set to its true condition by the outputs $I_{11}$ or $I_{14}$ of the torquer logic at the appropriate time interval $T_0$ or $T_2$. If there is a low level output (indicated by the true condition $I_{11}$), this must be added at $T_0$ to the lowest order of the number in memory. Accordingly, the AND gate 63a, which feeds the signal $I_{11}$ through OR gate 63 to set flip-flop 67 to true condition, is enabled to a $T_0$ signal. The signal $I_{14}$ represents a high level torquing signal and is fed at $T_2$ time to set the carry flip-flop to one at such time whereby the number in memory is changed by a unit in its third least significant order. Accordingly, the accumulator is caused to integrate by increments of one magnitude or another according to the existence of high or low discrete level torquer signals. The signal $I_{IN}$ fed to the AND gate in logic 64 together with the signal $T_0$ sets the add-subtract flip-flop 66 to its true condition if the signal $I_{IN}$ is true, indicating a positive polarity, whereby addition is required. Flip-flop 66 is set to zero at bit-time $T_s$ at the end of each word time whereby if the torquer signal is of negative polarity, the input signal polarity signal $I_{IN}$ is false and the flip-flop 66 is not set to true condition. In false condition, the flip-flop 66 operates in the add-subtract logic 69 on the carry-borrow flip-flop to command subtraction of a unit from the appropriate order of the number stored in memory. It will be readily appreciated that the output of the several flip-flops which are labeled $R_s$, $R_x$ and $R_k$, etc. are fed as indicated to the inputs of the several AND gates and OR gates by means of connections not shown in the FIG. 6 for purposes of maintaining clarity in the drawing.

While an accumulator for the device of FIG. 2 has been described and illustrated, it is to be appreciated that an accumulator for the device of FIG. 3 would differ only in the degree of simplification of the logic made possibly by elimination of one of the two discrete level signals, $I_{11}$ and $I_{14}$.

In operation of the devices of FIGS. 1, 2, and 3 any threshold or other scaling errors in the system will result in a drift or output error in the output from the register. These may be corrected by monitoring the output from the register with a signal derived from the stable platform employed in the digital guidance system application. Such aspect does not, however, constitute a feature of the present invention, means for performing such function being well-known to those skilled in the art.

Thus, the device of the present invention provides improved inertial sensing means providing an output signal of low-noise content, suitable for use in a digital control system.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A sensing instrument having an output representative of a sensed condition, threshold and polarity detection means responsive to an output of said instrument greater than a predetermined value for providing a discrete signal of substantially fixed magnitude and a polarity signal representative of the sense of said instrument output, means responsive to said signals for providing a substantially fixed magnitude feedback force to said instrument of a polarity corresponding to the sense of said output, means for storing a number, said means being, responsive to said signals for repetitively changing the number stored therein in increments of predetermined magnitude and with a sense corresponding to the sense of said output.

2. A sensing instrument having an output representative of a sensed condition, means responsive to outputs of said instrument within first and second ranges for providing first and second discrete signals of substantially fixed magnitudes and a polarity signal representative of the sense of said instrument outputs, means responsive to said signals for providing a feedback force to said instrument of a polarity corresponding to the sense of said output and of substantially fixed first and second magnitudes respectively corresponding to said first and second discrete signals, a means for storing a number, said means being responsive to said signals for repetitively changing the number stored therein in increments of first and second predetermined magnitudes respectively corresponding to said first and second discrete signals, and with a sense corresponding to the sense of said output.

3. The structure of claim 2 wherein said register stores a number represented by digital orders of predetermined relative weights, said feedback force magnitudes having a ratio which is the same as the ratio of weights of two of said digital orders.

4. In combination with a force-rebalance sensor having a movable member, a torquer, and an analog pickoff having an output substantially proportional to the displacement of said movable member; means responsive to said pickoff for providing one of a plurality of mutually exclusive fixed magnitude signals, each uniquely representing a different one of a range of absolute values proportional to the output from said pickoff; means responsive to said pickoff for providing a polarity signal indicative of the polarity of the output from said pickoff; logic means responsive to said one of a plurality of mutually exclusive fixed magnitude signals, and said polarity signal and cooperating with said torquer to provide a feedback force to said movable member of a sense opposed to that of the displacement of said movable member and of one of a plurality of fixed distinct magnitudes, each corresponding to an individual one of said ranges of values and indicative of the displacement of said movable member.

5. Means for providing a digital signal indicative of the time integral of a force comprising: an analog force-rebalance type of force sensing assembly having a mass and force-rebalance torquer and providing an analog output, digital conversion means responsively connected to the analog output from said sensing assembly for providing digital signals representing at least three discrete combinations of magnitude and sense of displacement of said mass relative to said sensing assembly, means responsively connected to the output of said digital conversion means for providing a digital output signal indicative of the time integral of the force input to said sensing assembly, and a digital torquing control means responsively connected to the output of said digital conversion means for providing a discrete torquing current having one of three mutually exclusive discrete states indicative of said relative displacement of said mass, said torquing control means being operatively connected to said torquer for opposing said displacement of said mass.

6. In a force rebalance type angular accelerometer, having a proof mass mounted for rotation about an axis relative to said accelerometer and a torquer, the output from said accelerometer being operatively connected to said torquer for opposing angular displacement of said proof mass relative to said accelerometer, said torquer comprising a torquing coil having two end terminals and a centertap terminal, the combination comprising: digitizer logic and torquing current generator means interposed between the output from said accelerometer and said torquer, said digitizer logic including means for providing logic signals indicative of at least two discrete combinations of magnitude and sense of the displacement of said proof mass relative to said accelerometer; a source of potential connected between said logic means and said centertap terminal of said torquing coil, said torquing generator being responsively connected to said digitizer logic for providing to said torquer mutually exclusive discrete torquing currents of at least two discrete levels from said potential source to one or the other alternatively of said two end terminals of said torquing coil, said digitizer logic comprising a first amplifier having a first threshold level; a second amplifier having a second threshold level less than the threshold of said first amplifier, said first and second amplifiers being responsively connected to the output from said accelerometer; a first digitizer for providing a first output indicative of the presence of an output signal from said first amplifier and further providing a second two-state output signal indicative of the absence of an output signal from said first amplifier; a second digitizer for providing a third two-state output signal indicative of the presence of an output signal from said second amplifier; a third digitizer for providing a fourth two-state signal indicative of the presence of an output signal from said second amplifier of one sense, and further providing a fifth two-state output signal indicative of the presence of an output signal from said second amplifier of the opposite sense; a first AND gate responsive to said second, third and fourth two-state signals and arranged for driving a first bi-stable circuit element for providing a first discrete logic signal; a second AND gate responsive to said first and fourth two-state signals and arranged for driving a second bi-stable circuit element for providing a second discrete logic signal; a third AND gate responsive to said second, third, and fifth two-state signals and arranged for driving a third bi-state circuit element for providing a third discrete logic signal; and a fourth AND gate responsive to said first and fifth two-state signals and arranged for driving a fourth bi-stable circuit element for providing a fourth logic signal.

7. The device of claim 6 in which said torquing current generator is comprised of a first, second, third and fourth constant current path responsively connected to said first, second, third and fourth bi-stable circuit elements respectively, said second and fourth paths providing current flow of a first discrete level, said first and third paths providing current of a second discrete level which is less than said first level, said first and second paths being commonly connected to said first end-terminal of said torquing coil for providing a first pair of torquing control signals of at least two discrete levels and of like sense, said third and fourth paths being commonly connected to said second end-terminal of said torquing coil for providing a second pair of torquing control signals of discrete levels similar to and of a sense opposed to that of said first pair of control signals.

8. The device of claim 7 in which each of the first, second, third and fourth constant current paths of said torquing current generator is comprised of: an output terminal in series circuit with a diode, a series impedance, and a two-terminal current control impedance, a first terminal of said current control impedance and a second terminal of said current control impedance being connected to said output terminal of said current path; and a zener diode connected across said first terminal of said current control impedance and said centertap terminal of said torquing coil.

9. In a force-rebalance type angular accelerometer, having a proof mass mounted for rotation about an axis relative to said accelerometer and a torquer, the output from said accelerometer being operatively connected to said torquer for opposing angular displacement of said proof mass relative to said accelerometer, said torquer comprising a torquing coil having two end terminals and a centertap terminal, the combination comprising: digitizer logic and torquing current generator means interposed between the output from said accelerometer and said torquer, said digitizer logic being arranged for providing logic signals indicative of at least two discrete combinations of magnitude and sense of the displacement of said proof mass relative to said accelerometer, a source of potential connected between said logic means and said centertap terminal of said torquing coil, said torquing generator being responsively connected to said digitizer logic for providing to said torquer mutually exclusive discrete torquing currents of at least two discrete levels from said potential source to one or the other alternatively of said two end terminals of said torquing coil, and an accumulator responsively connected to the output of said digitizer logic means for providing a digital output indicative of the time integral of the input of said accelerometer.

10. The device claimed in claim 9, in which the digitizer logic comprises: a first OR gate responsively connected to first and third bi-stable circuit elements for providing a two-state logic signal indicative of signals of a first discrete level, a second OR gate responsively connected to second and fourth bi-stable circuit elements for providing a two-state logic signal indicative of signals of a second discrete level, a third OR gate responsively connected to said third and fourth bi-stable circuit elements for providing a two-state logic signal indicative of the sense of said signals, said source of potential being commonly connected to the output of said OR gates, a first, second, and third resistor being interposed in series circuit between said source and said first, second, and third OR gate respectively, said accumulator being responsively connected to said OR gates.

11. The device claimed in claim 10, in which the digitizer logic comprises a first amplifier having a first threshold level; a second amplifier having a second threshold level less than the threshold of said first amplifier, said first and second amplifiers being responsively connected to the output from said accelerometer; a first digitizer for providing a first output indicative of the presence of an output signal from said first amplifier and further providing a second two-state output signal indicative of the absence of an output signal from said first amplifier; a second digitizer for providing a third two-state output signal indicative of the presence of an output signal from said second amplifier; a third digitizer for providing a fourth two-state signal indicative of the presence of an output signal from said second amplifier of one sense, and further providing a fifth two-state output signal indicative of the presence of an output signal from said second amplifier of the opposite sense, a first AND gate responsive to said second, third and fourth two-state signals and arranged for driving a bi-stable circuit element for providing a first discrete logic signal, a second AND gate responsive to said first and fourth two-state signals and arranged for driving a second bi-stable circuit element for providing a second discrete logic signal, a third AND gate responsive to said second, third, and fifth two-state signals and arranged for driving a third bi-state circuit element for providing a third discrete logic signal, a fourth AND gate responsive to said first and fifth two-state signals and arranged for driving a fourth bi-stable circuit element for providing a fourth logic signal.

References Cited by the Examiner

UNITED STATES PATENTS

| | | | |
|---|---|---|---|
| 2,905,877 | 9/59 | Ciscel | 318—29 |
| 2,942,476 | 6/60 | Turner | 73—517 |
| 2,943,493 | 7/60 | Bosch | 73—503 |
| 2,988,737 | 6/61 | Schroeder | 73—517 |
| 3,028,550 | 4/62 | Naydan | 324—70 |
| 3,081,637 | 3/63 | Gevas | 73—503 |

RICHARD C. QUEISSER, *Primary Examiner.*

SAMUEL LEVINE, JAMES J. GILL, *Examiners.*